M. W. SEIFERT.
SLEIGH.
APPLICATION FILED AUG. 24, 1918.

1,310,252.

Patented July 15, 1919.

Inventor
Martin W. Seifert

By Victor J. Evans
Attorney

UNITED STATES PATENT OFFICE.

MARTIN WILHELM SEIFERT, OF EAST BOUNTIFUL, UTAH.

SLEIGH.

1,310,252. Specification of Letters Patent. Patented July 15, 1919.

Application filed August 24, 1918. Serial No. 251,347.

*To all whom it may concern:*

Be it known that I, MARTIN W. SEIFERT, a subject of the German Government, residing at East Bountiful, in the county of Davis and State of Utah, have invented new and useful Improvements in Sleighs, the specification of which was filed under date of August 24, 1918, Serial No. 251,347.

This invention relates to sleds, particularly to those of the hand type, and has for its object the provision of a sled having its runners provided with individually operable brake members connected with guide levers mounted on the sled and so arranged that actuation of either of the brake members will guide the sled in its course and simultaneous actuation of both brake members will retard the progress of the sled and bring it to a stop.

An important object is the provision of a sled of this character in which the brake members are both entirely separate and so arranged that a greatly varying degree of pressure may be exerted upon them individually or simultaneously for carrying out the desired action.

A further object is the provision of a sled of this character in which the brake members are entirely inclosed when in their inactive positions so that injury to the mechanism thereof will be prevented.

Another object is the provision of a sled of this character in which the guide levers are movable through brackets which serve as guides for their proper movement and which also serve as stops for preventing undue movement of the brake members.

An additional object is the provision of a sled of this character which will be simple and inexpensive in manufacture, easy to operate, efficient in service, durable in use, and a general improvement of the art.

With the above and other objects and advantages in view, the invention consists in the details of construction to be hereinafter more fully described and claimed, and illustrated in the accompanying drawings in which:—

Figure 1:
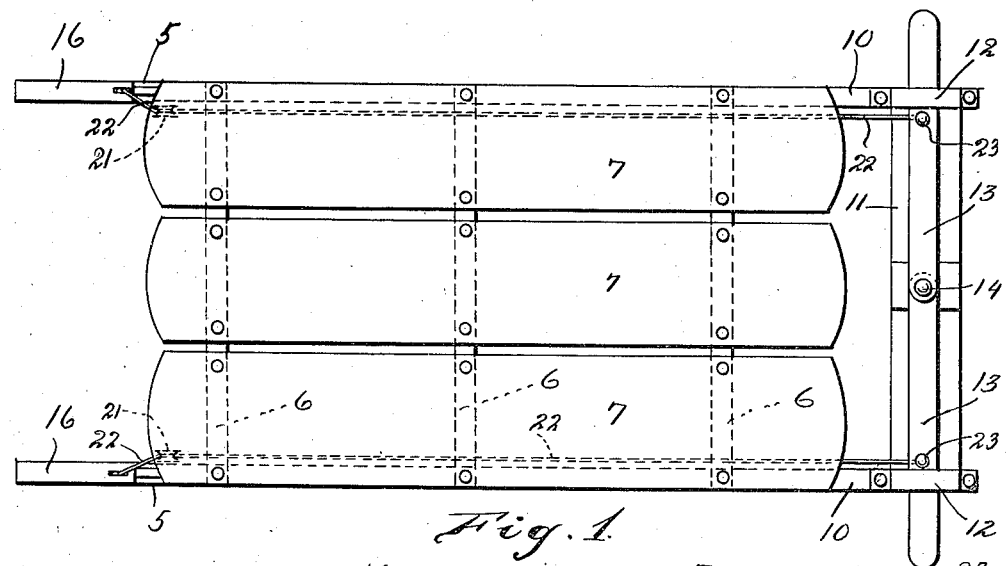
Figure 1 is a top plan view of a sled constructed in accordance with my invention.
Figure 2:
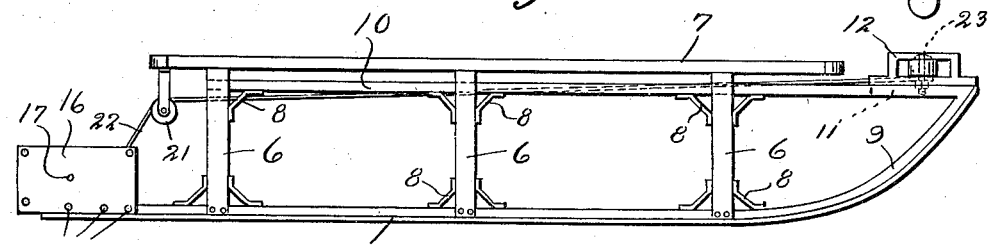
Fig. 2 is a side elevation thereof.
Figure 3:
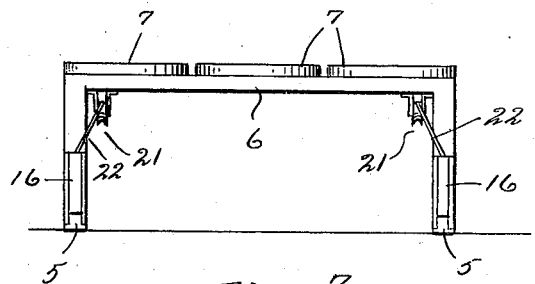
Fig. 3 is a rear elevation.
Figure 4:
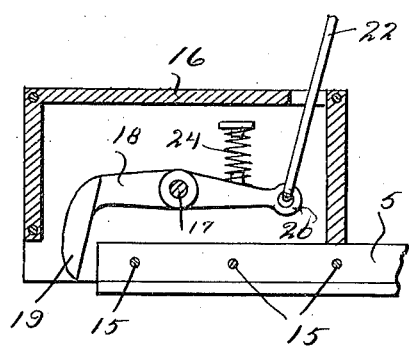
Fig. 4 is a detail longitudinal sectional view through one of the brake member housings.

Referring more particularly to the drawing the numeral 5 designates the runners to which are secured the lower ends of the upwardly extending arches 6 which carry the usual platform 7. Brace members 8 are provided at the juncture of the arches 6 with the runners 5 and also at the junctures of the arches 6 with the platform 7. At their forward ends, the runners 5 are curved upwardly in the usual manner as shown at 9 and are connected with the forward end of the platform member. The platform 7 consists of the usual longitudinally extending side bars 10 and the ordinary wooden flooring thereon.

Secured upon the forward ends of the side bars 10 is a transverse bar 11 to the ends of which are secured spaced brackets 12 for a purpose to be described. Separate hand levers 13 are disposed upon the transverse bar 11 and are pivotally connected therewith at their inner ends as shown at 14, the levers being disposed within the brackets 12 which will serve as guides therefor.

Secured upon the rear end of each runner by suitable rivets 15, is a preferably rectangular housing 16 within which is pivoted, as shown at 17, a brake member 18 carrying at one end a steel shoe 19 and having its other end provided with an eye 20. Secured upon the rear ends of the side bars 10 are pulleys 21 over which are trained flexible members, such as cables or wires 22 which extend into the housings 16 and which are secured to the eyes 20 at the ends of the brake members 18. These flexible members 22 extend beneath the platform 7 and have their other ends connected with the hand levers 13 adjacent the outer ends thereof in any suitable manner, as by passing them through suitable holes 23. Coiled springs 24 are disposed within the housings 16 and engage against the brake members 18 for normally holding these brake members in such position that the shoes 19 will be disposed entirely within the housings 16.

A sled provided with my improved combined brake and guiding mechanism is used in the same manner as an ordinary sled except that it possesses advantages thereover in affording guiding as well as braking means. In order to guide the sled so that its course will be directed to either side, it is merely necessary that the operator push upon the selected one of the hand levers 13, whereupon the associated flexible member 22 will pull upon the end of the corresponding brake member and move the brake member in opposition to the spring 24 so that the shoe 19 will be projected from the bottom of the housing 16 into engagement with the snow or ice being traveled over. Whichever one of the levers 13 is moved, the corresponding side of the sled will be retarded in its movement, and the course of the sled will be consequently changed. When it is desired to check the progress of the sled, it is merely necessary that the operator press upon both of the handles 13, whereupon both of the shoes 19 will be projected from the casings or housings and will engage the snow or ice traveled over to exert a braking action.

From the foregoing description and a study of the drawing it will be apparent that I have thus provided a very simple and efficient means whereby the course of a sled may be changed and whereby its progress may be checked or brought to a stop. It will be noted that the brake members are entirely inclosed except when their use is desired and they are therefore protected against injury. It will furthermore be obvious that the degree of frictional engagement of the brake members with the snow or ice is governed entirely by the degree of pressure exerted upon the hand levers 13. It will also be noted that the engagement of the levers 13 with the ends of the brackets 12 will cause the brackets 12 to serve as stops for preventing undue pull upon the brake members which might result in damage thereto.

While I have shown and described the preferred embodiment of my invention, it will of course be readily understood that I reserve the right to make such changes in the form, construction and arrangement of parts as will not depart from the spirit of the invention nor the scope of the subjoined claims.

Having thus described my invention, I claim:—

1. In combination with a sled, combined guiding and braking means comprising a housing secured in vertical position upon the rear end of each runner of the sled, an angular lever pivoted substantially centrally within each housing, a shoe on the rear end of each lever adapted to be projected from the bottom of the housing, a coil spring within each housing normally holding the lever with the shoe in retracted position entirely inclosed within the housing, and means connected with each lever and independently operable to project the corresponding brake shoe beyond its housing.

2. A sled attachment comprising an upwardly extending rectangular housing secured upon the rear end of each runner of the sled with the runner serving as a bottom closure for the housing, the housing projecting beyond the end of the runner whereby to provide an opening in the bottom of the housing, a brake lever pivoted intermediate its ends within each housing, a shoe on the rear end of each lever, a spring within each housing engaging the corresponding lever forwardly of its pivot point and holding the shoe in retracted position entirely within the housing, guide pulleys disposed adjacent and above said housings, flexible members connected with the forward ends of said levers and trained over said guide pulleys and separate means for pulling upon the flexible members for moving the corresponding brake lever to project said shoe beyond the housing.

In testimony whereof I affix my signature.

MARTIN WILHELM SEIFERT.